United States Patent
Kramer et al.

(10) Patent No.: US 12,277,333 B2
(45) Date of Patent: Apr. 15, 2025

(54) COMPUTER-IMPLEMENTED METHOD FOR OPTIMIZING THE MEMORY OF A PARTITIONED SYSTEM

(71) Applicant: Robert Bosch GmbH, Stuttgart (DE)

(72) Inventors: Simon Kramer, Leonberg (DE); Franck Youk, Stuttgart (DE); Michael Abel, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 106 days.

(21) Appl. No.: 18/176,956

(22) Filed: Mar. 1, 2023

(65) Prior Publication Data
US 2023/0289085 A1    Sep. 14, 2023

(30) Foreign Application Priority Data
Mar. 9, 2022   (DE) ............... 10 2022 202 335.8

(51) Int. Cl.
*G06F 3/06*    (2006.01)
(52) U.S. Cl.
CPC .......... *G06F 3/0644* (2013.01); *G06F 3/0604* (2013.01); *G06F 3/0673* (2013.01)
(58) Field of Classification Search
CPC ...... G06F 3/0604; G06F 3/061; G06F 3/0611; G06F 3/062; G06F 3/0644; G06F 3/0649; G06F 3/0679; G06F 3/0683; G06F 3/0685; G06F 12/1441; G06F 2212/1016; G06F 2212/1052; G06F 2212/173
See application file for complete search history.

(56) References Cited

U.S. PATENT DOCUMENTS

2019/0232891 A1* 8/2019 Ishigooka ............. G06F 3/0622

FOREIGN PATENT DOCUMENTS

DE    10 2015 218 589 A1    3/2017

* cited by examiner

*Primary Examiner* — Larry T Mackall
(74) *Attorney, Agent, or Firm* — NORTON ROSE FULBRIGHT US LLP; Gerard A. Messina

(57) ABSTRACT

A computer-implemented method for optimizing the memory of a partitioned system including multiple memories, at least one processing core, and at least one memory protection unit (MPU), each MPU including multiple registers. The method includes calculating run-time changes of each piece of data of a multitude of data which are to be processed by the processing core, with the respective piece of data being placed in each memory of the multiple memories based on access statistics for the respective piece of data, each piece of data of the multitude of data being assigned to one rights area or multiple rights areas; determining a placement of the data in the memories based on the calculated run-time changes; and allocating the multiple registers of the MPU for the certain placement of the data in the multiple memories, one register of the multiple registers identifying a memory area of the multiple memories.

15 Claims, 3 Drawing Sheets

COMPUTER-IMPLEMENTED METHOD FOR OPTIMIZING THE MEMORY OF A PARTITIONED SYSTEM

BACKGROUND INFORMATION

Modern multi-core control units include a memory hierarchy or a multi-part memory system, this being made up of a multitude of memories. The memories may differ with respect to their size and their access speed. Local memories frequently have a lower capacity, but have a higher access speed. Memories having a greater capacity, in contrast, are usually slower, i.e., they have a lower access speed. The execution speed of a program or of an application on a processing core decisively depends on the distribution of the data in the available memories. German Patent Application No. DE 10 2015 218 589 describes a method for improving the memory allocation in a system including a multitude of memories, the decision as to in which memory a piece of data or data element is stored being made based on an overall access time.

Due to the increased computing capacity, now no longer only one task, but multiple tasks are carried out in parallel on a control unit in many situations. These tasks are separated from one another for security reasons. If, for example, multiple applications unwittingly access the same memory location, stored values are overwritten, for example, and continue to be used incorrectly in an application. To prevent this and to ensure a correct execution, a memory protection unit (MPU) may be used. A system designed in this way is referred to as being partitioned. For this purpose, the memory protection unit (MPU) includes a limited number of registers, each register identifying a memory area (e.g., with the aid of a start address and an end address of the memory area). In some partitioned systems of the related art, first the configuration of the memory protection unit (MPU) is carried out, and thereafter the memory assignment and optimization of the data. In some situations, only a local optimality is achieved in this way. If an unlimited number of registers of the memory protection unit were available, the method according to German Patent Application NO. DE 10 2015 218 589 could continue to be used (which, however, is not the case in reality). After the distribution of the data has been carried out, the registers would be assigned to the memory areas generated as a result of the distribution (and, depending on the number of the memory areas, more or fewer registers would be required). If, additionally, the boundary condition of the necessary separation of the data were not to be taken into consideration, a memory optimization would violate the existing configuration, and thus result in a non-executable system. Due to the partitioning of the system and the resultant necessary use of a memory protection unit including a limited number of registers, a need exists for a new method for memory optimization.

SUMMARY

A first general aspect of the present invention relates to a computer-implemented method for optimizing the memory of a partitioned system which includes multiple memories, at least one processing core and at least one memory protection unit (MPU), each memory protection unit (MPU) including multiple registers. According to an example embodiment of the present invention, the method includes calculating run-time changes of each piece of data of a multitude of data which are to be processed by the at least one processing core, with the respective piece of data being placed in each memory of the multiple memories based on access statistics for the respective piece of data. The method furthermore includes determining a placement of the data in the memories based on the calculated run-time changes. The method furthermore includes assigning the multiple registers of the at least one memory protection unit (MPU) for the certain placement of the data in the multiple memories, one register of the multiple registers describing the boundaries of a memory area of the multiple memories, and each piece of data of the multitude of data being assigned to a rights area or multiple rights areas.

A second general aspect of the present invention relates to a computer system, which is designed to carry out the computer-implemented method according to the present invention for optimizing the memory of a partitioned system.

A third general aspect of the present invention relates to a computer program which is designed to carry out the computer-implemented method of the present invention for optimizing the memory of a partitioned system according to the first general aspect (or one specific embodiment thereof).

A fourth general aspect of the present invention relates to a computer-readable medium or signal which the computer program according to the third general aspect (or one specific embodiment thereof) stores and/or includes.

The method according to the first general aspect (or one specific embodiment thereof) of the present invention may, in some situations, enable the distribution of the data in the multiple memories in such a way that an overall access time is decreased, even though the system is a partitioned system, and a memory protection unit only has a limited number of registers. In this way, a more efficient operation of the system is possible, and tasks or applications may be carried out more quickly on the processing cores. The parallelization enabled with the aid of the method may result either in a smaller, and thus less expensive, control unit or otherwise in a use of the control unit for an increased number of tasks. In the process, the use of the method described in the present invention is not limited to control units, but may also be used in other systems which include a multi-part memory system encompassing memories having different speeds and/or sizes. This enables the secure use of individual pieces of data without the risk of unwitting overwriting or the risk of a collision in the case of unwitting simultaneous access to these very data by multiple applications, in conjunction with an improved distribution of the data in the memories, to enable a time-efficient access to the data by the processing cores.

Several terms are used in the following manner in the present invention:

A "memory" may be a data memory or also a data medium on/in which data are stored (saved). A memory may be read out or written to by a computer or any kind of peripheral device. A memory may be a semiconductor memory and/or a magnetic memory or a memory based on a technology not described here. A memory may be a volatile memory and/or a non-volatile memory. A memory may encompass one of RAM, ROM, EPROM, HDD, SDD, etc. on/in which data are stored.

A "piece of data" or "data", where piece of data refers to an individual unit or an individual element of data, shall be understood to mean "a re-interpretable representation of information in a formalized manner suitable for communication, interpretation or processing" (according to ISO/IEC 2382-1). A piece of data may be present in binary form. A piece of data may, for example, be a variable, a constant and/or a function.

A "memory protection unit" may be a hardware and/or software unit. A memory protection unit includes registers, the registers including memory areas or writing thereto. A memory protection unit may include a dedicated memory, a preconfigured hardware logic, and an internal data link. A memory protection unit may include an interface to the outside, for example to a processing core or a communication link. A memory protection unit may be part of a processor (central processing unit, CPU).

A "memory area" or an address area may be a delimited area of a memory. A memory area may be accessed with the aid of physical or virtual addresses, it being possible for a memory area to encompass an address or a coherent multitude of individual addresses, "coherent" meaning that individual addresses are situated next to one another. A memory area may therefore be identified with the aid of a start address and an end address.

A "processing core" shall be understood to mean the central part of a microprocessor, it also being possible for multiple processing cores to be present in a microprocessor. A processing core may carry out arithmetic or logic operations on input data and/or pieces of information.

A "rights area" may, for example, be a context in which a piece of data which is assigned to this rights area is used. For example, this rights area may be determined by an application to be executed by a processing core, which requires certain data which then belong to this very rights area or rights context.

A "program" or an "application" may, for example, encompass application software for solving user problems and/or encompass system software and/or service programs. This may be software for the correct sequence of a computing system or this may be programs which support the program creation and provide general services, for example formatting, file management, data transfer, etc. A program or an application may also encompass parts of an operating system, compilers, database systems, closed-loop control software and/or open-loop control software or all types of software and/or computer programs.

A "vehicle" may be any device which transports passengers and/or freight. A vehicle may be a motor vehicle (for example a passenger car or a truck), but also a rail vehicle. A vehicle may also be a motorized, non-motorized and/or a muscle power-operated two-wheeler or three-wheeler. However, floating and flying devices may also be vehicles. Vehicles may operate at least semi-autonomously or be assisted.

DETAILED DESCRIPTION OF EXAMPLE EMBODIMENTS

Figure 1:
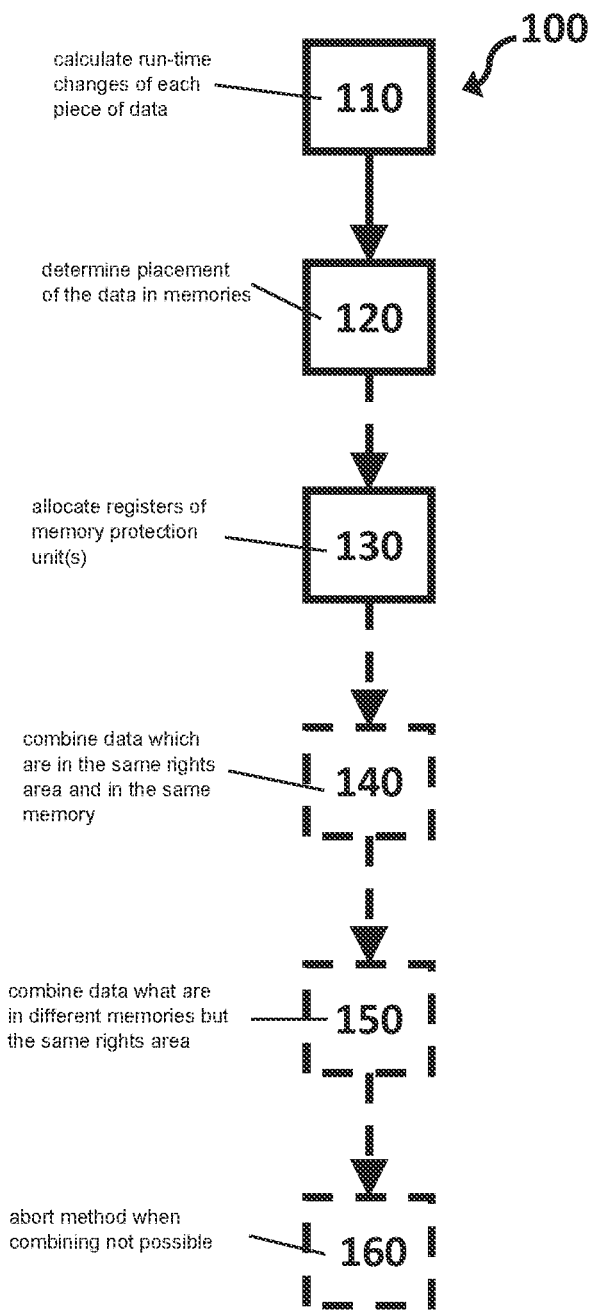
FIG. 1 schematically illustrates a computer-implemented method for optimizing the memory of a partitioned system, according to an example embodiment of the present invention.
Figure 2:
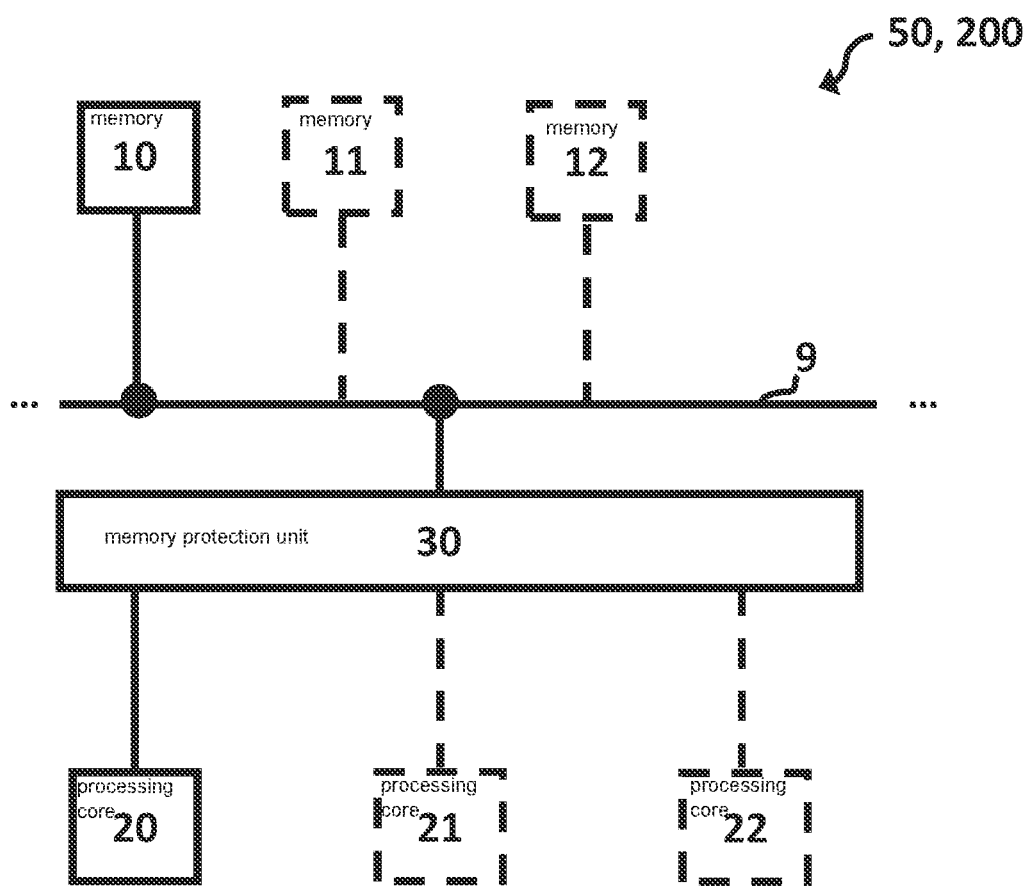
FIG. 2 schematically illustrates an exemplary specific embodiment of a partitioned system which includes multiple memories, at least one processing core, and a memory protection unit, according to the present invention.
Figure 3:
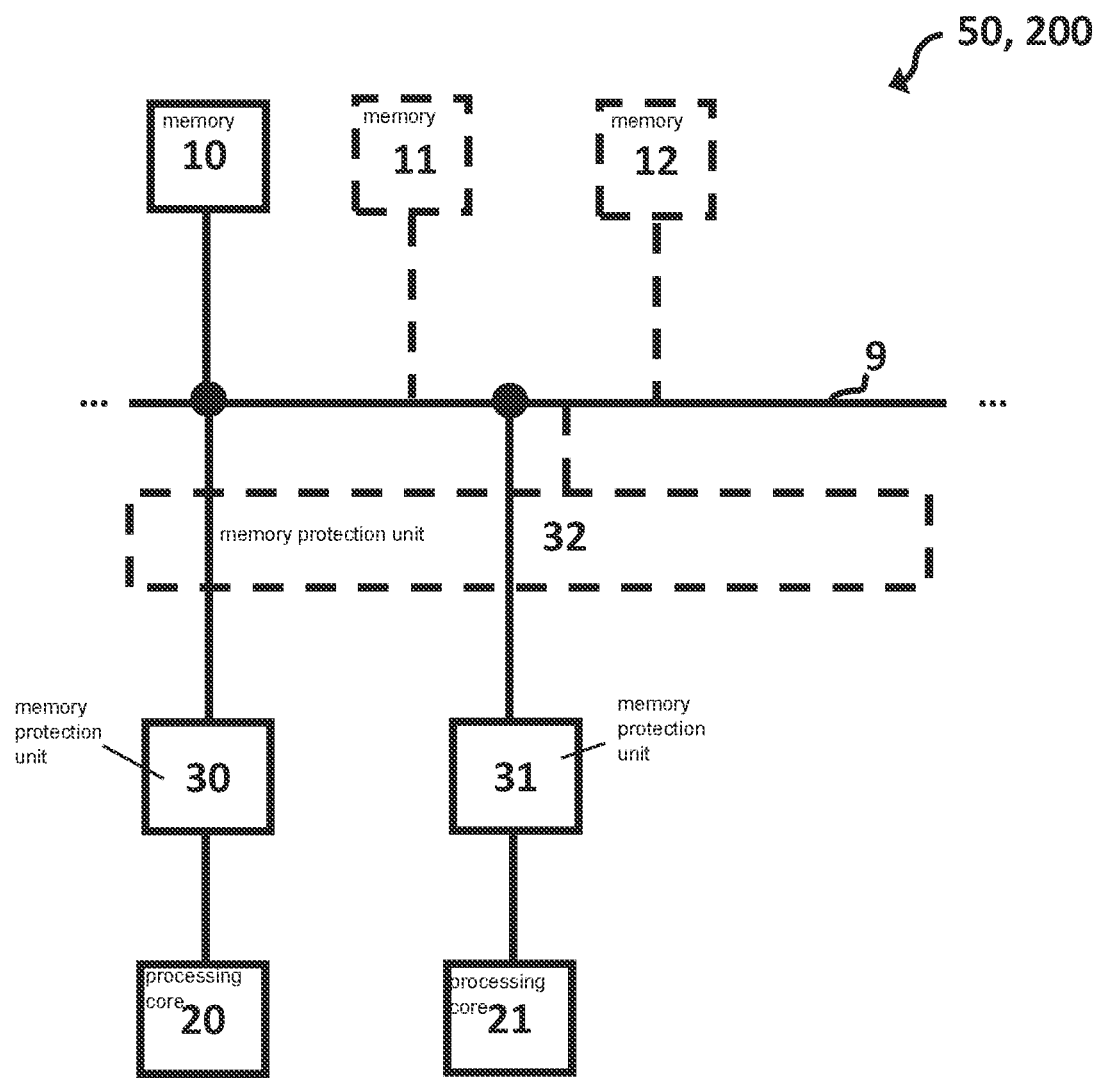
FIG. 3 schematically illustrates an exemplary specific embodiment of a partitioned system which includes multiple memories, two processing cores, and at least two memory protection units, according to the present invention.

A computer-implemented method 100 for optimizing the memory of a partitioned system 50 is described, which includes multiple memories 10, at least one processing core 20, and at least one memory protection unit (MPU) 30, each memory protection unit 30 including multiple registers. FIG. 2 shows one exemplary specific embodiment of partitioned system 50. In the exemplary system 50 in FIG. 2, three processing cores 20, 21 and 22 are connected via a memory protection unit 30 to three exemplary memories 10, 11 and 12. A bus system or another form of a signal line may serve as a connecting line 9 in the process, for example. FIG. 3 shows one further exemplary specific embodiment of partitioned system 50. In this exemplary system 50 in FIG. 3, two processing cores 20 and 21 are each connected via a memory protection unit 30 and 31 to a signal line. In one further example, this specific embodiment may be expanded by one further memory protection unit 32, which is connected to the respective individual memory protection units 30 and 31, i.e., is connected between the signal line and the individual memory protection units. System 50 may, for example, include >=1, >=2, >=3, >=4, >=5, >=6 or more processing cores 20. System 50 may include >=1, >=2, >=3, >=4, >=5, >=6, >=10, >=20 or more memories 10. System 50 may, for example, include >=1, >=2, >=3, >=4, >=5, >=6 or more memory protection units 30, which may be situated in different configurations and/or be interconnected to one another. For example, each processing core may include a dedicated memory protection unit. In one further example, it is also possible for 1, 2 or more processing cores to be connected to a memory protection unit 30. In one further example, it is also possible for all processing cores to be connected to only one memory protection unit 30. In one further example, multiple memory protection units 30 may be connected in series. Each of the at least one memory protection unit 30 may include >=1, >=2, >=3, >=4, >=5, >=6, >=10, >=20 or more registers (e.g., between 3 and 20 registers). The number of the multiple registers of the at least one memory protection unit 30 may be limited (e.g., fewer than 50 or fewer than 20). An exemplary method 100 is shown in FIG. 1.

Method 100 includes calculating 110 run-time changes of each piece of data of a multitude of data which are to be processed by the at least one processing core 20, with the respective piece of data being placed in each memory 10 of the multiple memories 10 based on access statistics for the respective piece of data, each piece of data of the multitude of data being assigned to a rights area or multiple rights areas. In the process, access statistics may be ascertained based on a read access frequency and/or write access frequency for a piece of data of the multitude of data, and accordingly for the duration of a read access and/or the duration of a write access to a piece of data of the multitude of data in a memory 10 (i.e., based on historical data and/or simulated data). As an alternative, calculation 110 of the run-time changes may also take place for individual groups of data which may be considered together, for example, due to a certain classification. In the process, calculation 110 is not based on access statistics of an individual piece of data of the multitude of data, but a combination of data in the form of a group. In the process, run-time changes may be based on a difference or on the result of a comparison between an access time in the case of a placement of a piece of data in a memory and the access time in the case of another placement of the piece of data (in another memory). For example, when a second placement compared to a first placement results in a shortening of the access time, the difference in the access times may be a run-time gain. A run-time gain of a piece of data may be the difference between an access time in the case of a certain placement of the piece of data and the access time in the case of a worse placement (i.e., a placement having a longer or higher access time) of the piece of data, it being possible for a worse placement to then be a reference. In another example, when a second placement compared to a first placement results in an increase in the access time, the difference in the access times may be a run-time loss. In the process, a run-time loss of a piece of data may be the difference between an access time in the case of a certain placement of the piece of data and the access time in the case of a better placement (i.e., a placement having a shorter or smaller access time) of the piece of data, it being possible for a better placement to then be a reference. Furthermore, a shortest run time may be a reference for the calculation of a run-time loss. Run time may be the overall run time of an application, it being possible for a decrease in an access time to a piece of data to result in a decrease in the overall run time of the application, and it being possible for an increase in the access time to a piece of data to result in an increase in the overall run time of the application. In one further example, an arbitrary value may be a reference to calculate a run-time change, for example a run-time gain and/or a run-time loss, of a certain placement of a piece of data.

The method furthermore includes determining 120 a placement of the data in memories 10 based on the calculated run-time changes. As a result of the calculated run-time changes, a memory location may be determined for each piece of data of the multitude of data, which would be advantageous (e.g., theoretically optimal) for this very piece of data with respect to the memory access. Based on this, an arrangement of the collectivity of the data in the multiple memories 10 may be determined, which decreases an overall access time compared to other arrangements and/or is (approximately) minimal, or, in other words, (approximately) optimizes the placement of the data in memories 10.

The method furthermore includes allocating 130 the multiple registers of the at least one memory protection unit 30 for the certain placement of the data in the multiple memories 10, one register of the multiple registers identifying a memory area of the multiple memories 10. The identification of a memory area by a register of the multiple registers may take place with the aid of the boundaries of the memory area (for example with the aid of a start address and a target address). Each processing core 20, which carries out different tasks or applications, must access certain data, which were previously assigned to the memory locations, for the execution of these tasks or applications. It is to be prevented in the process that a processing core, during the execution of a task, accesses a memory area or the data present there for the use of which processing core 20 has no permission. Allocation 130 thus encompasses the ascertainment as to which processing core 20 must be able to and/or is permitted to access which memory area. The memory areas or address areas which may be described by a start address and an end address must be stored in the registers of the at least one memory protection unit 30, which are then assigned to processing core 20 which must and/or is permitted to access these very memory areas in the course of its task to be executed. This results in a number of theoretically necessary registers in the at least one memory protection unit 30.

The method may furthermore include combination 140 of data which are in the same rights area and in the same memory 10. Each piece of data of the multitude of data is assigned to a rights area or a rights context as a result of the task or application for which this very piece of data is provided. If multiple pieces of data of the same rights area or rights context are now in the same memory 10, these pieces of data may be combined. Combination 140 may mean storing the data of the same rights area in the same memory next to one another, so that larger memory areas may result. Combination 140 may have an influence on the number of the theoretically necessary registers in the at least one memory protection unit 30. For example, as a result of combination 140, the number of theoretically necessary registers in the at least one memory protection unit 30 may be reduced or decreased.

The method may furthermore, as is optionally shown in FIG. 1, when, during the allocation of the multiple registers of the at least one memory protection unit 30, more registers are required for the certain placement of the data in the multiple memories 10 than are available in the at least one memory protection unit 30, include combination 150 of data which are in different memories, but the same rights area, until the number of the registers in the at least one memory protection unit 30 is sufficient. As described above, the number of the theoretically necessary registers results from allocation 130. When the number of the theoretically necessary registers exceeds the existing registers in the at least one memory protection unit, data which are in different memories, but the same rights area, may be combined 150. In this way, the number of necessary memory areas may decrease, and consequently also the number of the necessary registers in the at least one memory protection unit 30 may decrease. This process may be carried out until the number of registers present in the at least one memory protection unit 30 is sufficient. Combination 150 may be carried out selectively only for memory protection units 30 whose number of registers is not sufficient, separately for all memory protection units 30 and/or collectively for all or a portion of the at least one memory protection unit 30.

The combination may take place in various ways. For example, combination 150 of data may be carried out based on a run-time change. In one example, data having a low run-time gain may be combined first. The data which, during determination 120 of the placement of the data, were placed in such a way that their (realized) run-time gain is a low run-time gain, i.e., is lower than a majority of the run-time gains of other data, may be combined first during combination 150. In one example, combination 150 may be started with data having a lowest run-time gain, and be continued with data according to increasing run-time gains. For example, combination 150 may be started with data which have a run-time gain which is lower than a majority of the run-time gains of other data. In other words, combination 150 may be started with data whose combination 150 generates an only slight worsening or decrease of an overall run-time gain (i.e., that the overall run time remains approximately the same). In another example, data having a high run-time loss may be combined first. The data which, during determination 120 of the placement of the data, were placed in such a way that their (realized) run-time loss is a high run-time loss, i.e., is higher than a majority of the run-time losses of other data, may be combined first during combination 150. In one example, combination 150 may be started with data having a highest run-time loss, and be continued with data according to decreasing run-time losses. In another example, combining 150 may also be started with data having another high run-time loss. In other words, combination 150 may be started with data whose combination 150 generates an only slight worsening or increase of an overall run-time loss (i.e., that the overall run time remains approximately the same). In another example, the data which are in different memories, but the same rights area, may also be arbitrarily combined. As a result of combination 150, the overall access time or the run time of a task, an application or a program may increase/worsen. As a result of this procedure, however, the number of the theoretically necessary registers may be decreased. Combination 150 may be carried out until the number of the registers present in the at least one memory protection unit 30 is sufficient. Combination 150 may be carried out once, twice, three times or multiple times.

Method 100 may furthermore include aborting 160 the method when combination 150 of the data based on a run-time change is not possible. If combination 150 of the data cannot be carried out in such a way that the number of registers present in the at least one memory protection unit 30 is sufficient, or, in other words, if the number of the theoretically necessary registers still exceeds the number of registers of the at least one memory protection unit 30 when a further combination 150 of the data is no longer possible, an abortion 160 of the method may take place. An abortion 160 of the method may generate a warning message or an error message to other components of the system, to a user, or a backend. In one example, abortion 160 may generate a message to other partitioned systems, so that these take over or execute the functions, applications and/or programs.

The run-time gain may be ascertained in various ways. As described above, in a first step of method 100, a calculation 110 of the run time changes of each piece of data of the multitude of data is carried out. In one example, a run-time change may be a run-time gain. In some examples, the run-time gain may be the difference between a run time in the case of a certain placement of the piece of data and the run time in the case of the worst placement of the piece of data. In the process, a placement of the piece of data which has a longest overall access time may be determined, i.e., the worst placement for the piece of data. The arithmetic difference between the access time (i.e., run time) in the case of a certain placement of a piece of data and a worst placement of the piece of data may be a run-time gain. This means, proceeding from a worst placement of a piece of data, the access time to this piece of data decreases in the case of a certain (i.e., a different) placement, the run time of an application or of a program which is being executed in processing core 20 decreasing as a result of a decreased access time. In other words, for a run-time gain of a piece of data in the case of a certain placement, an access time of a worst placement may be used as a reference value. In another example, an access time which is higher than a majority of access times of placements of the piece of data may be used as a reference value (i.e., comparison value).

As an alternative, the run-time gain may be the difference between a run time (i.e., access time) in the case of a certain placement of the piece of data and an established run time. In the process, a fictitious value may be predefined, on which the run-time gains of the individual pieces of data may be referenced, i.e., by taking the difference between the determined run times and this fictitious value, the run-time gains (compared to this very fictitious value) may be calculated. In one example, this established value may be a run time which is higher than a highest run time of run times based on empirical values from the past. In another example, an arbitrary value may be used which is greater than the value of a longest run time of a piece of data.

A run-time loss may be ascertained in various ways. As described above, in a first step of method 100, a calculation 110 of the run-time changes of each piece of data of the multitude of data is carried out. In another example, a run-time change may be a run-time loss. In some examples, the run-time loss may be the difference between a run time in the case of a certain placement of the piece of data and the run time in the case of the best placement of the piece of data. In the process, a placement which has a shortest overall access time may be determined, i.e., the best placement for the piece of data. The arithmetic difference between the access time (i.e., run time) in the case of a certain placement of a piece of data and a best placement of the piece of data may be a run-time loss. This means, proceeding from a best placement of a piece of data, the access time to this piece of data increases in the case of a certain (i.e., at a different) placement, the run time of an application or of a program which is being executed in processing core 20 increasing as a result of an increased access time. In other words, for a run-time loss of a piece of data in the case of a certain placement, an access time of a best placement may be used as a reference value. In another example, an access time which is lower than a majority of access times of placements of the piece of data may be used as a reference value (i.e., comparison value).

As an alternative, the run-time loss may be the difference between a run time (i.e., access time) in the case of a certain placement of the piece of data and an established run time. In the process, a fictitious value may be predefined, on which the run-time losses of the individual pieces of data may be referenced, i.e., by taking the difference between the determined run times and this fictitious value, the run time losses (compared to this very fictitious value) may be calculated. In one example, this established value may be a run time which is lower than a lowest run time of run times based on empirical values from the past. In another example, an arbitrary value may be used which is lower than the value of a lowest run time of a piece of data.

Furthermore, the at least one processing core may execute one or multiple applications, it being possible to only allow a processing core access to data when the data are assigned to a rights area which is determined by the one application or the multiple applications to be executed. As explained above, processing core 20 may execute tasks or applications. For a corresponding task or application, the processing core requires certain data, which may thereby be assigned to the rights area or rights context which is determined by the application. An application may be assigned multiple rights areas in the process. A piece of data may optionally also be assigned to multiple rights areas. If the processing core accesses data which are not assigned to a rights area which may be determined by the application to be executed by the processing core, the processing core is not allowed access, or, in other words, the processing core is only allowed access to data when the processing core requires these data for executing its application or its task.

System 50 of the present invention may be differently configured and/or be used in different applications.

For example, system 50, which includes multiple memories 10, 11, at least one processing core 20, 21, and at least one memory protection unit 30, may be part of a component of a vehicle. For example, the component may be an embedded system. In some examples, the component may be a control unit in a vehicle. In other examples, the component may be a central processing unit of a vehicle, a central communication interface of a vehicle or another component of the vehicle. In the process, for example $>=1$, $>=2$, $>=5$, $>=10$, $>=50$ or $>=100$ components (e.g., control units) may be situated in a vehicle.

However, system 50 may also be used in other areas of computer technology and/or data processing. For example, system 50 may be an embedded system (e.g., a control unit) in a system other than a vehicle (e.g., a robot, an industrial plant or machine, a tool, a household appliance, a building technology system or other systems).

Furthermore, a computer system 200 is described, which is designed to carry out computer-implemented method 100 for optimizing the memory of a partitioned system 50. Computer system 200 may be partitioned system 50. In this way, computer system 50 may include the at least one processing core 20 (or, e.g., all processing cores), the multiple memories 10 (or, e.g., all memories) and/or the at least one memory protection unit 30.

Furthermore, a computer program is described, which is designed to carry out computer-implemented method 100 for optimizing the memory of a partitioned system 50. The computer program may (partially) be computer-implemented method 100 itself. The computer program may be present, e.g., in interpretable form or in compiled form. It may be loaded (also in parts) into the RAM of a computer, e.g., as a bit or byte sequence, for execution. The computer program may include multiple parts, at least one part being executed on the at least one processing core 20 and another part being executed on the at least one memory protection unit 30.

What is claimed is:

1. A computer-implemented method for optimizing memory of a partitioned system which includes multiple memories, at least one processing core, and at least one memory protection unit, each memory protection unit including multiple registers, the method comprising the following steps:
calculating run-time changes of each respective piece of data of a multitude of data which are to be processed by the at least one processing core, with each respective piece of data being placed in a memory of the multiple memories based on access statistics for the respective piece of data, each respective piece of data of the multitude of data being assigned to a rights area or multiple rights areas;
determining a placement of the respective pieces of data in the memories based on the calculated run-time changes; and
allocating the multiple registers of the at least one memory protection unit for the determined placement of the respective data in the memories, each register of the multiple registers identifying a memory area of the multiple memories;
wherein the method includes at least one of the following two features (I)-(II):
(I) each of the run-time changes that is calculated is a degree of gain or loss in run-time usage of a respective one of the pieces of data by a respective placement of the respective piece of data in the memory compared to a reference run-time usage metric; and
(II) the method further comprises, when, during the allocation of the multiple registers of the at least one memory protection unit, more registers are required for the determined placement of the respective pieces of data in the multiple memories than are available in the at least one memory protection unit, combining those of the respective pieces of data which are (i) in different ones of the memories but (ii) in a same one of the rights areas, until a number of registers in the at least one memory protection unit is sufficient.

2. The computer-implemented method as recited in claim 1, further comprising:
combining those of the respective pieces of data which are in the same rights area and in the same memory.

3. The computer-implemented method as recited in claim 1, further comprising:
when, during the allocation of the multiple registers of the at least one memory protection unit, more registers are required for the determined placement of the respective pieces of data in the multiple memories than are available in the at least one memory protection unit, the combining of those of the respective pieces of data which are (i) in the different ones of the memories but (ii) in the same one of the rights areas, until the number of registers in the at least one memory protection unit is sufficient.

4. The computer-implemented method as recited in claim 3, wherein the combining of the respective pieces of data is carried out based on a run-time change.

5. The computer-implemented method as recited in claim 4, further comprising:
aborting the method when the combination of the respective pieces of data based on the run-time change is not possible.

6. A computer system configured to optimizing memory of a partitioned system which includes multiple memories, at least one processing core, and at least one memory protection unit, each memory protection unit including multiple registers, the computer system configured to:
calculate run-time changes of each respective piece of data of a multitude of data which are to be processed by the at least one processing core, with each respective piece of data being placed in a memory of the multiple memories based on access statistics for the respective piece of data, each respective piece of data of the multitude of data being assigned to a rights area or multiple rights areas;
determine a placement of the respective pieces of data in the memories based on the calculated run-time changes; and
allocate the multiple registers of the at least one memory protection unit for the determined placement of the respective data in the memories, each register of the multiple registers identifying a memory area of the multiple memories;
wherein the system includes at least one of the following two features (I)-(II):
(I) each of the run-time changes that is calculated is a degree of gain or loss in run-time usage of a respective one of the pieces of data by a respective placement of the respective piece of data in the memory compared to a reference run-time usage metric; and
(II) the computer system is further configured to, when, during the allocation of the multiple registers of the at least one memory protection unit, more registers are required for the determined placement of the respective pieces of data in the multiple memories than are available in the at least one memory protection unit, combine those of the respective pieces of data which are (i) in different ones of the memories but (ii) in a same one of the rights areas, until a number of registers in the at least one memory protection unit is sufficient.

7. The computer-implemented method as recited in claim 1, wherein the each of the run-time changes that is calculated is the degree of gain or loss in run-time usage of the respective one of the pieces of data by the respective placement of the respective piece of data in the memory compared to the reference run-time usage metric.

8. The computer-implemented method as recited in claim 7, wherein the each of the run-time changes is a difference between: (i) a run time in a case of the respective placement of the respective piece of data, and (ii) an established run time.

9. The computer-implemented method as recited in claim 1, wherein a number of the multiple registers of the at least one memory protection unit is limited.

10. The computer-implemented method as recited in claim 1, wherein boundaries of each memory area are described by a start address and an end address.

11. The computer-implemented method as recited in claim 1, wherein each respective piece of data of the multitude of data is a variable or a constant or a function.

12. The computer-implemented method as recited in claim 1, wherein the at least one processing core executes one or multiple applications, and a processing core is only allowed access to data when the data are assigned to a rights area which is determined by the one application or the multiple applications to be executed.

13. The computer-implemented method as recited in claim 1, wherein the system is part of a control unit in a vehicle.

14. A non-transitory computer-readable medium on which is stored a computer program for optimizing memory of a partitioned system which includes multiple memories, at least one processing core, and at least one memory protection unit, each memory protection unit including multiple registers, the computer program, when executed by a computer, causing the computer to perform a method that includes the following steps:

calculating run-time changes of each respective piece of data of a multitude of data which are to be processed by the at least one processing core, with each respective piece of data being placed in a memory of the multiple memories based on access statistics for the respective piece of data, each respective piece of data of the multitude of data being assigned to a rights area or multiple rights areas;

determining a placement of the respective pieces of data in the memories based on the calculated run-time changes; and allocating the multiple registers of the at least one memory protection unit for the determined placement of the respective data in the memories, each register of the multiple registers identifying a memory area of the multiple memories;

wherein the method includes at least one of the following two features (I)-(II);

(I) each of the run-time changes that is calculated is a degree of gain or loss in run-time usage of a respective one of the pieces of data by a respective placement of the respective piece of data in the memory compared to a reference run-time usage metric; and (II) the method further comprises, when, during the allocation of the multiple registers of the at least one memory protection unit, more registers are required for the determined placement of the respective pieces of data in the multiple memories than are available in the at least one memory protection unit, combining those of the respective pieces of data which are (i) in different ones of the memories but (ii) in a same one of the rights areas, until a number of registers in the at least one memory protection unit is sufficient.

15. The computer-implemented method as recited in claim 7, wherein the each of the run-time changes is a difference between: (i) a run time in a case of the respective placement of the respective piece of data, and (ii) a run time in a case of a worst placement or a best placement of the piece of data.

* * * * *